United States Patent
Zhou et al.

(10) Patent No.: US 9,801,187 B1
(45) Date of Patent: Oct. 24, 2017

(54) METHOD AND APPARATUS FOR CONTROLLING CHANNEL OCCUPANCY BASED ON ENERGY-LEVEL-CODED QUALITY OF SERVICE INDICIA

(71) Applicant: Sprint Spectrum L.P., Overland Park, KS (US)

(72) Inventors: Yu Zhou, Herndon, VA (US); Luca Zappaterra, Arlington, VA (US); Muhammad A. Naim, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 168 days.

(21) Appl. No.: 14/933,204

(22) Filed: Nov. 5, 2015

(51) Int. Cl.
  *H04W 72/08* (2009.01)
  *H04W 72/04* (2009.01)
  *H04W 28/02* (2009.01)
  *H04W 52/18* (2009.01)
  *H04W 52/26* (2009.01)

(52) U.S. Cl.
  CPC ....... *H04W 72/08* (2013.01); *H04W 72/0446* (2013.01); *H04W 28/0268* (2013.01); *H04W 52/18* (2013.01); *H04W 52/265* (2013.01)

(58) Field of Classification Search
  CPC ............. H04W 72/08; H04W 72/0446; H04W 28/0268; H04W 28/24; H04W 52/18; H04W 52/26–52/267
  See application file for complete search history.

(56) References Cited

U.S. PATENT DOCUMENTS

| | | | | |
|---|---|---|---|---|
| 2012/0225687 A1* | 9/2012 | Norair | ............... | H04L 1/0061 455/522 |
| 2015/0124785 A1* | 5/2015 | Merlin | ............... | H04L 47/32 370/336 |
| 2015/0131641 A1* | 5/2015 | Ong | ............... | H04W 48/20 370/338 |
| 2016/0081031 A1* | 3/2016 | Barriac | ............ | H04W 52/0261 370/311 |
| 2016/0278049 A1* | 9/2016 | Nory | ............... | H04L 1/1896 |

* cited by examiner

*Primary Examiner* — Eric Myers (57) ABSTRACT

An improved method for controlling how long a device will occupy a wireless channel, based on consideration of QoS class of communication on the channel. With respect to a communication that the device detects on the channel, the device could determine QoS class by detecting a sequence of energy levels in association with the detected communication, the sequence of energy levels indicating the QoS class. The disclosed method could be applied by a cellular base station to control how long the base station will provide cellular service on the channel, where the channel is also used for other communications such as WiFi communications for instance.

20 Claims, 6 Drawing Sheets

METHOD AND APPARATUS FOR CONTROLLING CHANNEL OCCUPANCY BASED ON ENERGY-LEVEL-CODED QUALITY OF SERVICE INDICIA

BACKGROUND

Unless otherwise indicated herein, the description provided in this section is not itself prior art to the claims and is not admitted to be prior art by inclusion in this section.

In a wireless communication system, a base station may serve user equipment devices (UEs) such as cell phones, wirelessly-equipped computers, tracking devices, embedded wireless modules or the like (whether or not actually "user" operated) over an air interface. In practice, such an air interface may be defined on one or more particular radio frequency channels each spanning a range of frequency spectrum, and the air interface may be divided over time into a continuum of transmission time units, such as frames, subframes, timeslots, symbol durations, and the like, in which communications may pass on a downlink from the base station to the UEs and on an uplink from the UEs to the base station using a designated modulated and encoding scheme. The particular structure of the air interface may be compliant with a wireless wide area network (WWAN) air interface protocol (i.e., radio access technology), such as Orthogonal Frequency Division Multiple Access (OFDMA) (e.g., Long Term Evolution (LTE)), Code Division Multiple Access (CDMA), Global System for Mobile Communications (GSM), or others now known or later developed.

In such a system, the base station may manage the transmission of data on the downlink and uplink in the defined transmission time units (and in particular resources, such as particular subcarriers, defined in those transmission time units). For instance, as the base station receives data destined to particular UEs, the base station may schedule downlink transmission of that data to occur in particular transmission time units and may transmit the data over the air to the UEs in the scheduled transmission time units. Similarly, as UEs have data to send to the base station, the UEs may send scheduling requests to the base station, the base station may then schedule uplink transmission of that data to occur in particular transmission time units, and the UEs may then transmit the data over the air to the base station in the scheduled transmission time units.

In usual practice, each frequency channel on which a base station serves UEs in such a system would be licensed or otherwise dedicated for use specifically with respect to the air interface protocol on which the base station operates—such as LTE, CDMA, GSM, or the like. Recently, however, there has been a move to allow such base stations to also (or alternatively) make use of unlicensed frequency channels, such as those commonly used for wireless local area network (WLAN) communications like WiFi (e.g., IEEE 802.11 protocols). One example of this, known as LTU-Unlicensed (LTE-U) or LTE Assisted Access (LAA), involves an LTE base station making use of the same frequency channels that are used for WiFi (e.g., 20 MHz wide carriers in the 5 GHz band). With such an arrangement, the base station may thus provide UEs with WWAN service on the same frequency channel that devices in nearby home and business WLANs are using.

OVERVIEW

To help manage operation on an unlicensed channel or the like, the entities communicating on the channel may engage in a Listen Before Talk (LBT) process, by which an entity seeking to transmit on the channel first checks whether the channel is clear before then proceeding to transmit on the channel. In an example LBT process, for instance, the transmitting entity may tune to the channel and measure the energy level (e.g., total detected receive signal strength) on the channel to determine whether the energy level on the channel remains below a predefined threshold level for a predefined assessment period. If the entity detects that the energy level remains below the threshold level for the assessment period, then the entity may deem the channel to be clear for use and may proceed to transmit on the channel. Whereas, if the entity detects that the energy level rises above the threshold level (perhaps with some hysteresis), then the entity may stop monitoring the channel and deem the channel to be busy, and the entity may wait a period of time before again checking whether the channel is clear for use.

An issue with the LBT process is how long an entity should occupy the channel once the entity determines that the channel is clear to use. For instance, once the entity determines that the channel energy level is below the threshold level for assessment period, at issue is then how long the entity should then transmit on the channel before the entity then repeats the LBT process if necessary for further transmission. As other entities may wish to use the channel as well, the channel occupancy time should be set to a reasonable level, perhaps on the order of 1 and 10 milliseconds.

One possible approach would be to define a fixed channel occupancy time that all entities would use. With this approach, once an entity determines that the channel is clear, the entity could then engage in transmission on the channel for up to that fixed channel occupancy time before then repeating the LBT process if necessary for further transmission.

Another possible approach would be to dynamically select an occupancy time based on an evaluation of load on the channel. With this approach, if the channel is more heavily loaded with communication traffic, then the entity could use a shorter channel occupancy time, and if the channel is lightly loaded, then the entity could use a longer channel occupancy time. As an example of this, if the channel is used for WiFi communication, a WiFi device seeking to transmit on the channel could use its WiFi radio to read other WiFi transmissions on the channel so as to evaluate load based on metrics such as number of different WiFi service set identifiers (SSIDs) broadcast per unit time, number of WiFi data communications per unit time, and/or number of different WiFi device addresses (e.g., Media Access Control (MAC) addresses) designated as source and/or destination addresses in such communications per unit time, and the WiFi device could then set its channel occupancy time accordingly.

Disclosed herein is an improved method and corresponding system for controlling how long an entity will occupy a wireless channel, based on consideration of quality of service (QoS) class of communication on the channel. For instance, an entity seeking to communicate on the channel could determine QoS class (e.g., priority level, importance level, application type, etc.) of communications on the channel and could set its channel occupancy time to a duration inversely proportional to the determined QoS class. Further, the entity could also determine QoS class of its own communications on the channel and could set its channel occupancy time to a duration proportional to that determined QoS class. Still further, the entity could select and apply a channel occupancy time as a function of both QoS of others' communications on the channel and QoS of its own communications on the channel, such as any function that scales down the channel occupancy time if the QoS of others' communications are relatively high and that scales up the channel occupancy time if the QoS of its own communications are relatively high.

The disclosed method is especially useful in a scenario where the wireless channel is shared by two or more disparate wireless communication technologies, such as LTE and WiFi for instance, where a device that operates with one such technology may not have a radio that is compliant with the other technology and may also lack time synchronization with the other technology. But the method could also apply on a channel that is used for communications on just one air interface protocol, such as WiFi for instance.

Further, the channel at issue could be a licensed channel or could be an unlicensed channel. And the channel occupancy time at issue could be a duration of time that a device would be set to transmit on the channel as discussed above or could more generally be a duration of time that a device would be set to communicate on the channel, including perhaps transmitting and/or receiving on the channel. For instance, if the device is a WWAN base station that schedules downlink and/or uplink transmissions on the channel, the channel occupancy time could be a duration of time that the base station would use for such scheduled transmissions.

In accordance with the disclosure, entities making use of the channel will communicate and determine quality of service class information by a simple sequence of energy level variations on the channel, where the energy level could be either (i) a high level, being greater than or equal to a predefined threshold level or (ii) a low level, being less than the predefined threshold level. Optimally, the predefined threshold level could be the same level used in the channel assessment process noted above. And devices could be programmed with logic (e.g., program instructions and/or mapping data) that correlates particular such energy level sequences with particular QoS levels or the like. For instance, when a device transmits data on the channel, the device could end its transmission with such a predefined energy level sequence indicating the QoS class of the transmission. And another device that is going to make use of the channel could detect that transmission and read the energy level sequence at the end of the transmission to determine the QoS class, and could then use that determined QoS class as a basis to set and apply a channel occupancy time.

Accordingly, in one respect, disclosed is a method to control how long a device occupies a wireless channel. Per the method, the device monitors energy level on the channel, to determine whether the energy level on the channel is a high level or rather a low level, with the high level being defined as greater than or equal to a predefined energy level threshold, and the low level being defined as less than the predefined energy level threshold. Further, the device detects a communication on the channel by detecting, as an indication of the communication, the high level of energy on the channel during a channel assessment period. The device then determines a QoS class of the detected communication by detecting on the channel, in association with the detected communication, a sequence of energy levels each being either the high level or the low level, the sequence being an indication of the QoS class. And the device then establishes an occupancy time based at least in part on the determined QoS class of the detected communication and occupies the channel for the determined occupancy time.

In another respect, disclosed is a method to control how long a base station occupies a wireless channel, the base station being configured to serve UEs on the wireless channel according to a first air interface protocol, and the channel also being used for communication according to a second air interface protocol different than the first air interface protocol. Per the method, the base station monitors energy level on the channel, to determine whether the energy level on the channel is a high level or rather a low level, the high level being defined as greater than or equal to a predefined energy level threshold, and the low level being defined as less than the predefined energy level threshold. Further, the base station determines a first representative QoS measure of a plurality of communications that occur on the channel and that are not served by the base station and a second representative QoS measure of communications that are served by the base station (generally, or specifically on the channel). And the base station establishes an occupancy time as a function of at least the first and second representative QoS measures and then occupies the channel for the established occupancy time.

In this method, the base station may establish the first representative QoS measure of the a plurality of communications that occur on the channel and that are not served by the base station by (i) detecting, as an indication respectively of each communication of the plurality, the high level of energy on the channel, (ii) determining a QoS class respectively of each detected communication by detecting on the channel, in association with the detected communication, a respective sequence of energy levels each being either the high level or the low level, the sequence being an indication of the QoS class, and (iii) determining the first representative QoS measure based on the determined QoS classes of the plurality of detected communications. Alternatively, the base station may establish the measure in other ways.

Still further, disclosed is a base station configured to control how long the base station occupies a wireless channel, the base station being configured to serve UEs on the wireless channel according to a first air interface protocol, and the channel also being used for communication according to a second air interface protocol different than the first air interface protocol. Per the disclosure, the base station includes an antenna structure configured to wirelessly transmit and receive communications, and a controller (e.g., part of a radio chipset, or a host processor) configured to control operation of the base station, the controller being configured to carry out operations (e.g., cause the base station to carry out operations) such as those discussed above.

According to the disclosure, for instance, the controller could determine whether the energy level on the channel is a high level or rather a low level, the high level being defined as greater than or equal to a predefined energy level threshold, and the low level being defined as less than the predefined energy level threshold. Further, the controller could detect a communication on the channel by detecting, as an indication of the communication, the high level of energy on the channel during a channel assessment period. And the controller could determine a QoS class of the detected communication by detecting on the channel, in association with the detected communication, a sequence of energy levels each selected from the group consisting of the high level and the low level, the sequence being an indication of the QoS class. The controller could then determine an occupancy time based at least in part on the determined QoS class of the detected communication. And the controller could cause the base station to occupy the channel for the determined occupancy time.

These as well as other aspects, advantages, and alternatives will become apparent to those of ordinary skill in the art by reading the following detailed description, with reference where appropriate to the accompanying drawings. Further, it should be understood that the description provided in this overview section and elsewhere in this document is provided by way of example only.

DETAILED DESCRIPTION

The present disclosure will discuss the method and system by way of example in a scenario where a base station is configured to provide LTE service and where the wireless channel at issue is an unlicensed channel that may be used both for LTE communications scheduled by the base station and also for WiFi communications. As noted above, however, principles of the disclosure can apply in other contexts and arrangements as well, such as in connection with just a single air interface protocol, or involving a different mix of air interface protocols. Further, numerous variations from the specifics described, even within the context of LTE and WiFi, are possible as well.

Referring to the drawings, as noted above, FIG. 1 depicts an example arrangement in which features of the disclosure can be implemented. As shown, the arrangement includes a representative LTE base station (evolved Node-B (eNodeB)) 12 configured to serve LTE-capable UEs 14. The representative base station 12 is shown by way of example providing LTE service on at least two example wireless channels, a licensed channel 16 dedicated for LTE use (e.g., per government regulation) and an unlicensed channel 18 open for more general use. Further, the same unlicensed channel 18 is also shown being used for WiFi communication between various WiFi-capable devices 20 (e.g., end user WiFi nodes and/or WiFi access points).

Figure 1:
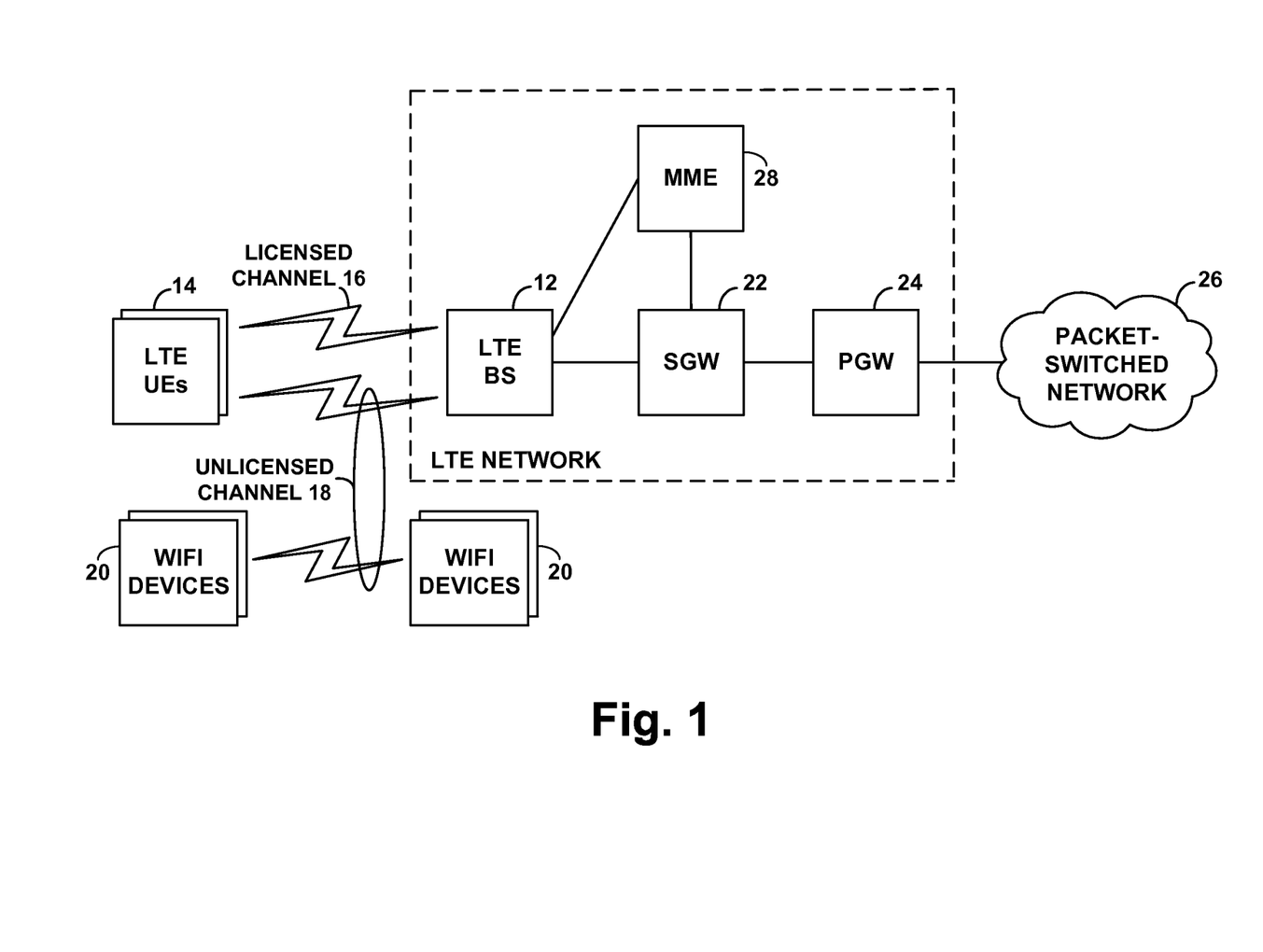
FIG. 1 is a simplified depiction of an arrangement in which features of the present disclosure can be implemented.

In practice, each of these representative channels would have a respective bandwidth spanning a particular range of frequency within a band of the RF spectrum. For example, the licensed LTE channel might have a bandwidth of 1.4 MHz, 3 MHz, 5 MHz, 10 MHz, or 20 MHz in the 800 MHz band, the 1.9 GHz band, or the 2.5 GHz band, and the unlicensed channel might have a bandwidth of 20 MHz or so in a band such as the 5 GHz band. For LTE use, a given such channel could be used to carry downlink and/or uplink communications. For instance, a channel could function as just the downlink or uplink portion of a frequency division duplex (FDD) carrier (in which case there may also be another such channel to carry traffic in the opposite direction). Alternatively, a channel could function as a time division duplex (TDD) carrier divided over time between downlink and uplink use.

As further shown in FIG. 1, base station 12 has a communication interface with a serving gateway (SGW) 22, which in turn has a communication interface with a packet data network gateway (PGW) 24 that provides connectivity with a packet-switched network 26. And base station 12 has a communication interface with a mobility management entity (MME) 28, which also has a communication interface with the SGW 22. In practice, these interfaces may be network connections through a core packet-switched network operated by a cellular wireless service provider.

With this LTE arrangement, when a UE 14 enters into LTE coverage of base station 12, the UE may engage in a process of attaching with and/or handing over to the base station, so that the UE and can then be served by the base station in a client-server relationship. Through attachment or handover, one or more bearer tunnels may then be established for the UE, extending ultimately between the UE and the PGW, including a radio bearer between the UE and the base station, and corresponding tunnels between the base station and the SGW and between the SGW and the PGW. The base station may then provide the UE with LTE communication service, controlling uplink communication of data from the UE to the base station for transmission to the gateway system and onto the packet-switched network, and controlling downlink communication from base station to the UE of data that the gateway system receives from the packet-switched network and forwards to the base station for transmission to the UE.

Under typical LTE service, the air interface bandwidth on the downlink and uplink is divided primarily into subcarriers that are spaced apart from each other by 15 kHz. Further, the air interface is divided over time into a continuum of 10-millisecond frames, with each frame being further divided into ten 1-millisecond subframes. In each subframe, the air interface is then considered to define a number of 12-subcarrier wide PRBs across the frequency bandwidth, as many PRBs as would fit in the frequency bandwidth. In addition, each subframe (and thus each PRB within the subframe) is divided over time into symbol segments of 67 μs each, with each symbol segment supporting transmission of OFDM symbols on respective subcarriers, and each OFDM symbol may represent a certain quantity of data according to an applied modulation and coding scheme. Thus, the base station and a served UE may transmit data to each other in these resource elements, particularly on subcarriers that are spaced apart from each other by 15 kHz and in time segments spanning 67 μs each.

The LTE air interface then defines various channels made up of certain ones of these resource blocks and resource elements. For instance, on the downlink, certain resource elements across the bandwidth may be reserved to define a physical downlink control channel (PDCCH), and other resource elements may be reserved to define a physical downlink shared channel (PDSCH) that the base station can allocate on an as-needed basis to carry transmissions from the base station to particular UEs, with still other resource elements being reserved to carry a downlink reference signal. Likewise, on the uplink, certain resource elements across the bandwidth may be reserved to define a physical uplink control channel (PUCCH), and other resource elements may be reserved to define a physical uplink shared channel (PUSCH) that the base station can allocate on an as-needed basis to carry transmissions from particular UEs to the base station.

In practice, the base station includes a scheduler that manages allocation of the shared channel resources for carrying data to and from UEs served by the base station. As the base station receives data from the SGW for transmission to served UEs, the scheduler may designate downlink PRBs of one or more upcoming subframes to carry the data. In particular, for transmission of data to a UE on PRBs of a given subframe, the base station may then transmit to the UE in the PDCCH of that subframe a Downlink Control Information (DCI) message that specifies the allocated PRBs, and the base station may transmit the data to the UE in those allocated PRBs. And as the base station receives scheduling requests from served UE, the scheduler may designate uplink PRBs of one or more upcoming subframes to carry the data. In particular, for transmission of data from a UE on PRBs of a given subframe, the base station may transmit to the UE a DCI message four subframes earlier, specifying the allocated PRBs, and the UE may then transmit the data to the base station in those allocated PRBs.

In normal LTE operation, the base station may have nearly full control over scheduling of the air interface resources within subframes on the licensed LTE channel 16. If the base station is serving multiple UEs at once, the base station may fairly allocate the air interface resources for use to facilitate communications to and from those served UEs.

The unlicensed channel, however, poses a more difficult issue for base station scheduling. As discussed above, the entities engaging in communication on such a channel may apply an LBT process to check whether the channel is clear before then transmitting on the channel for a channel occupancy time. If an LTE base station is going to make use of such a channel, the LTE base station may thus also apply such an LBT process. In particular, to facilitate use of the channel, the base station may measure total energy level on the channel to determine whether the channel is clear and, if so, may then use the channel for LTE service. At issue for the LTE base station in that process, however, is how long the base station should deem the channel to be available for scheduling of UE communications (e.g., PDSCH and/or PUSCH communications) and for other LTE communications before the base station would then repeat the LBT process to again check for availability.

As noted above, the present disclosure provides for dynamically establishing and applying a channel occupancy time based on consideration of QoS class of one or more communications on the channel. In practice, the LTE base station could carry out this process by evaluating QoS class of one or more communications on the unlicensed channel that do not involve the base station (e.g., that are not to or from the base station but are rather between other entities, such as WiFi devices 20) and setting a channel occupancy time based at least in part on that evaluation. Further, the base station could also take into account the QoS class of one or more communications that the base station itself serves (generally, or specifically on the channel at issue).

As noted above, the term QoS class could represent priority level, importance level, application type, or the like. For example, without limitation, voice communication could have be deemed to have a very high-level QoS class, video communication could be deemed to have a slightly lower QoS class, gaming communication could be deemed to have a still slightly lower QoS class, and file transfer, web browsing, and messaging traffic could be deemed to be "best efforts" traffic having a still lower QoS class.

Assuming by way of example that the communications by others on the channel are WiFi communications, one way that the base station could determine the QoS class of those communications is by using a WiFi radio to receive and read the communications. In that way, the base station may find a QoS class value specified in headers of the communications, or the base station may otherwise determine the type and corresponding QoS class of the communications. However, doing so may require the base station to have a WiFi radio and be able to read and interpret WiFi-specific communications.

Per the present disclosure, as noted above, an improved process involves using predefined sequences of energy levels on the channel as a basis to establish QoS class of communications on the channel. By encoding QoS class with simple sequences of energy levels, it could be possible for entities to evaluate QoS class of communications on the channel without needing to be operate according to the air interface protocol of those communications. For instance, with such an arrangement, an LTE base station could readily determine QoS class of WiFi communications and other communications on the channel.

The energy levels at issue here could be the same high and low energy levels that an entity such as the base station would detect as a basis to determine whether the channel is clear in the first place. From the perspective of the entity determining whether the energy level is high or low, for instance, at issue could be whether the energy level is greater than or equal to a defined energy level threshold. This threshold is a matter of design choice, but should be set to represent when there is likely activity on the channel (as compared with mere noise for instance). By way of example, without limitation, the threshold could be −62 dBm.

To facilitate this process, entities that communicate on the channel could encode QoS class of their communications by providing defined sequences of energy levels on the channel in a predefined association with their communications. For instance, when an entity transmits data on the channel, the entity could provide such a sequence at the end of their data communication. And another entity seeking to determine the QoS class of the communication could then simply read the energy level sequence that existed on the channel at the end of the communication and map that energy level sequence to the QoS class, or otherwise treat the detected sequence accordingly. Alternatively, the predefined energy level sequence could be provided in some other predefined manner in association with the communication, such as multiplexed throughout the communication for instance.

Figure 2:
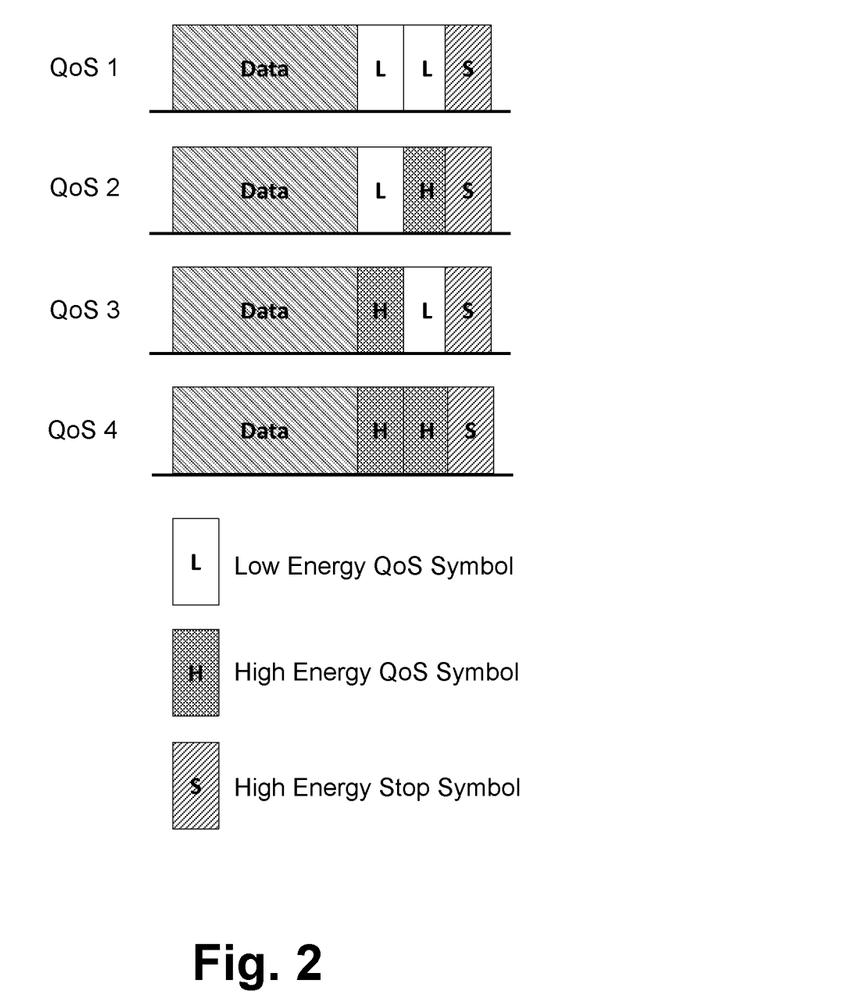
FIG. 2 is a depiction of example sequences of energy levels as indications of QoS classes.

FIG. 2 depicts how this could be done in an example implementation, with energy level QoS "symbols" that could be either high level (e.g., greater than or equal to the energy level threshold) or low level (e.g., lower than the energy level threshold). In the example of FIG. 2, these QoS symbols are each the same duration as each other, perhaps a few microseconds or some other suitable duration. But in practice, the sequences could be defined not only based on energy levels of the symbols but also based on duration of the symbols, with possible variation of duration within a given sequence, to provide greater granularity to represent a greater number of QoS classes for instance.

As shown in FIG. 2, there could be three types of QoS symbols: a low energy level symbol L, a high energy level symbol H, and a stop symbol S. In practice, the low energy level symbol L would have energy level lower than the energy level threshold, and the high energy level symbol H and stop symbol S would have energy level greater than or equal to the energy level threshold. The stop symbol S may in fact have the same high energy level as the high energy level symbol H. These levels could be provided by the transmitting entity setting its power of transmission for each symbol duration, perhaps transmitting with zero power for symbol L and transmitting with sufficiently high power for symbols H and S. An entity evaluating QoS class could then simply monitor energy level on the channel to determine the sequence of energy level as an indication of the QoS class.

In the example of FIG. 2, the QoS class of each data communication on the channel is indicated by a sequence of energy levels at the end of the data communication. In this process, a given data communication together with its energy level QoS symbols may last for whatever channel occupancy time the transmitting entity determines to use on the channel, and the final energy level QoS symbol is high energy stop symbol, after which the entity would be finished transmitting on the channel until the entity again carries out the LBT process.

Thus, an entity such as the base station that is evaluating the channel in an LBT process could detect the existence of a communication on the channel by detecting the high energy level on the channel per the LBT process and could then detect when there is low energy level on the channel for a sufficient threshold duration following a last detected high energy level on the channel, signifying that the detected communication has ended (as compared with low energy level for a short duration as an energy level QoS symbol for instance). In this process, the entity could keep a record of determined energy level on the channel. And upon detecting the end of the detected communication, the entity could then determine what the energy level sequence was leading up to (i.e., just before) that end, such as the sequence of energy levels leading up to the stop symbol.

The example of FIG. 2 shows how four different QoS classes could be represented by two energy level QoS symbols. In particular, one QoS class could be represented by a low-low sequence, another QoS class could be represented by a low-high sequence, yet another QoS class could be represented by a high-low sequence, and another QoS class could be represented by a high-high sequence (i.e., by the absence of low energy level at the end of the communication). In other implementations, each sequence could have a greater number of energy level QoS symbols (or in theory just one such symbol). Further, as noted above, the QoS class could be indicated more granularly by also being based on such symbols of possibly varying length.

In practice, entities using the channel could be programmed or provisioned with mapping data or other logic to correlate such sequences with QoS class, or otherwise to establish a QoS measure based on the sequences, so as to provide the sequences and read and make use of the information. Thus, detecting a sequence of energy levels on the channel could involve comparing energy levels on the channel with one or more predefined sequences of energy levels, in search of a match.

In an example implementation, the base station could regularly or continuously monitor the channel at issue to establish statistics regarding QoS class of communications on the channel. In particular, the base station could detect communications on the channel and detect, in association with each detected communication, a respective energy level sequence as an indication of QoS class of the communication. Further, the base station could generate a representative measure of QoS class of such communications over a most recent sliding window of time or the like. The measure could be a representative QoS class based on frequency of occurrence of particular QoS classes, such as a higher QoS class if there have been a greater number of high-QoS class communications recently and vice versa, or another such representative measure.

Further, the base station could regularly or continuously monitor QoS class of communications that it serves and could likewise generate a representative measure of QoS class of such communications over a most recent sliding window of time. The QoS class of communications that the base station serves may be indicated by QoS indicators (e.g., differential service point code (DSCP) values in packet headers of packets transmitted to or from the base station, or simply by a quality of service control indication (QCI) or other such attribute of a bearer on which the base station serves the communication.

The base station could then decide how long to occupy the channel, based on an evaluation of such QoS class information. For instance, the base station could set itself to occupy the channel for a channel occupancy time that is, at least in part, inversely proportional to the QoS class of communications by others that the base station detects on the channel, so as to occupy the channel for a shorter time upon detecting higher such QoS class(es) and vice versa. Further, the base station could set itself to occupy the channel for a channel occupancy time that is, at least in part, proportional to the QoS class of the communications that the base station has been serving, so as to occupy the channel for a longer time upon detecting higher such QoS class(es) and vice versa. In practice, the base station could apply a function of the two representative measures noted above, to decide on a channel occupancy time.

Once the base station determines a channel occupancy time, the base station may then occupy the channel accordingly for that time. In LTE, this may be a matter of deciding how many upcoming 1-millisecond subframes the base station should deem available for scheduling of shared channel communications and perhaps for other LTE communications (e.g., control channel communications). For instance, the channel occupancy time could be a duration ranging from 1 to 10 milliseconds (i.e., from 1 to 10 LTE subframes). The base station may then schedule LTE communications to occur on the channel in those subframes and otherwise make use of those subframes for LTE communication. And once those subframes pass, the base station may then repeat the LBT process, and, if the base station determines that the channel is available, then once more select and apply a channel occupancy time based on the base station's evaluation of QoS class of communications on the channel.

Figure 3:
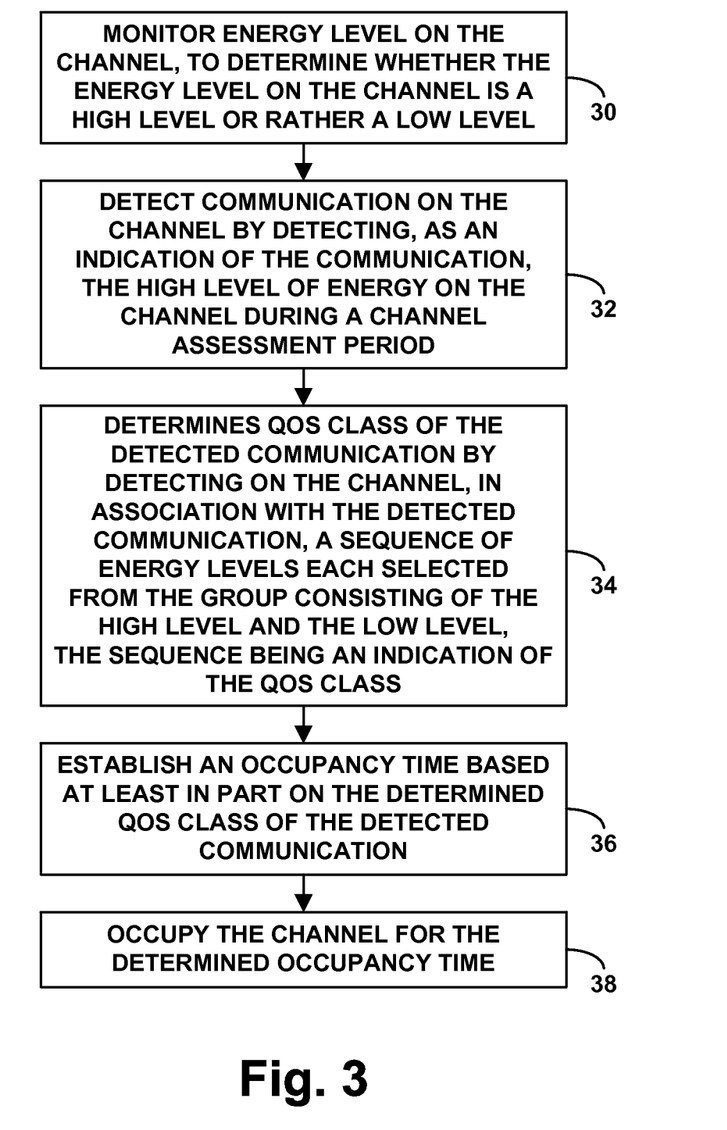
FIG. 3 is a flow chart depicting operations in an example method.

FIG. 3 is next a flow chart depicting a method to control how long a device occupies a wireless channel. As shown in FIG. 3, at block 30, the device monitors energy level on the channel, to determine whether the energy level on the channel is a high level or rather a low level. At block 32, the device detects a communication on the channel by detecting, as an indication of the communication, the high level of energy on the channel during a channel assessment period. At block 34, the device then determines a QoS class of the detected communication by detecting on the channel, in association with the detected communication, a sequence of energy levels each selected from the group consisting of the high level and the low level, the sequence being an indication of the QoS class. At block 36, the device then establishes an occupancy time based at least in part on the determined QoS class of the detected communication (e.g., based on the detected energy level sequence). And at block 38, the device then occupies the channel for the determined occupancy time.

In line with the discussion above, a device could carry out this process with respect to QoS class of at least one detected communication. Further, the device could detect multiple such communications and their respective QoS classes and could establish and apply an occupancy time based at least in part on the determined respective QoS classes of the plurality of communications. For instance, the device could establish and apply an occupancy time as a function of a cumulative QoS measure (e.g., recent average or trend) of determined QoS classes of the plurality of communications, and perhaps as a function of a cumulative QoS measure of such determined QoS classes and a cumulative QoS measure of QoS classes of communications in which the device itself engages in (e.g., has recently engaged in).

Figure 4:
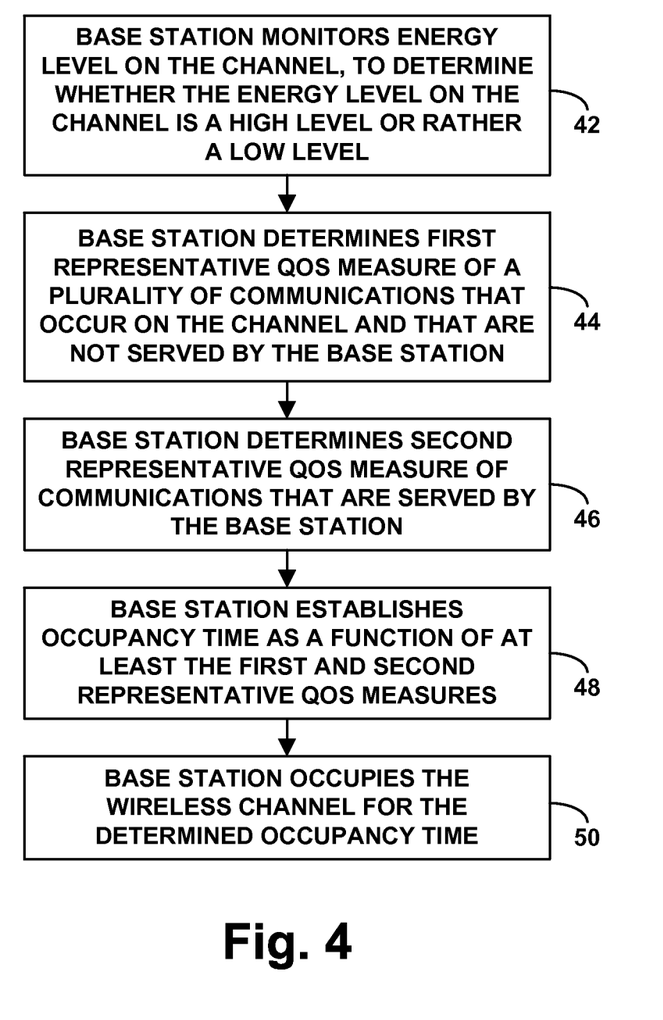
FIG. 4 is another flow chart depicting operations in an example method.

FIG. 4 is next a flow chart depicting a method to control how long a base station occupies a wireless channel (e.g., schedule and engage in scheduled communications on the channel), where the base station is configured to serve user equipment devices on the wireless channel according to a first air interface protocol (e.g., a WWAN protocol such as LTE), and where the channel is also used for communication according to a second air interface protocol different than the first air interface protocol (e.g., a WLAN protocol such as WiFi). As shown in FIG. 4, at block 42, the base station monitors energy level on the channel, to determine whether the energy level on the channel is a high level or rather a low level. At blocks 44 and 46 (which may occur as background operations), the base station then determines a first representative QoS measure of a plurality of communications that occur on the channel and that are not served by the base station and a second representative QoS measure of communications that are served by the base station. At block 48, the base station then establishes an occupancy time as a function of at least the first and second representative QoS measures. And at block 50, the base station occupies the wireless channel for the determined occupancy time.

Figure 5:
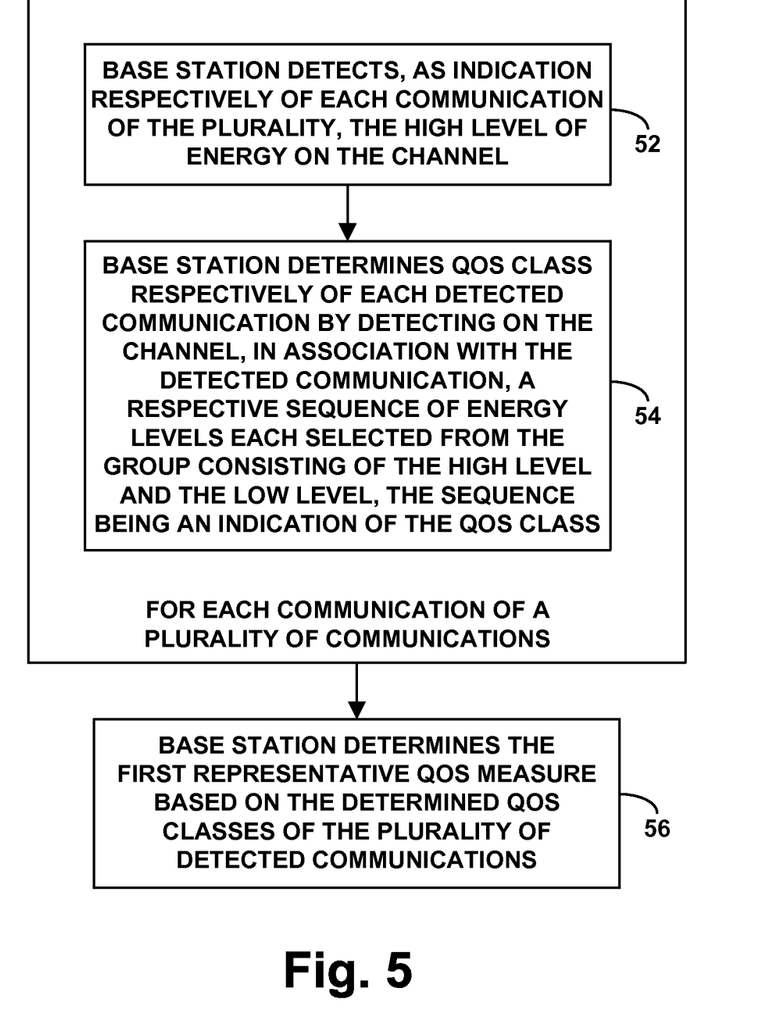
FIG. 5 is a flow chart depicting operations in block 44 of FIG. 4.

Further, FIG. 5 is a flow chart depicting example operations of the base station to carry out the feature of block 44, of determining the first representative QoS measure of the plurality of communications that occur on the channel and that are not served by the base station. As shown in FIG. 5, at block 52, the base station detects, as an indication respectively of each communication of the plurality, the high level of energy on the channel. At block 54, the base station determining a QoS class respectively of each detected communication by detecting on the channel, in association with the detected communication, a respective sequence of energy levels each selected from the group consisting of the high level and the low level, the sequence being an indication of the QoS class. And at block 56, the base station determines the first representative QoS measure based on the determined QoS classes of the plurality of detected communications, such as by computing any representative statistical measure (e.g., average, trend, etc.)

Features described above could be applied on the context of the features depicted in FIGS. 4 and 5. For instance, each QoS class could be indicated by just the sequence of energy levels or perhaps by a combination of the sequence of energy levels and each energy level of the sequence having a respective duration, to help provide more granular information as noted above.

Figure 6:
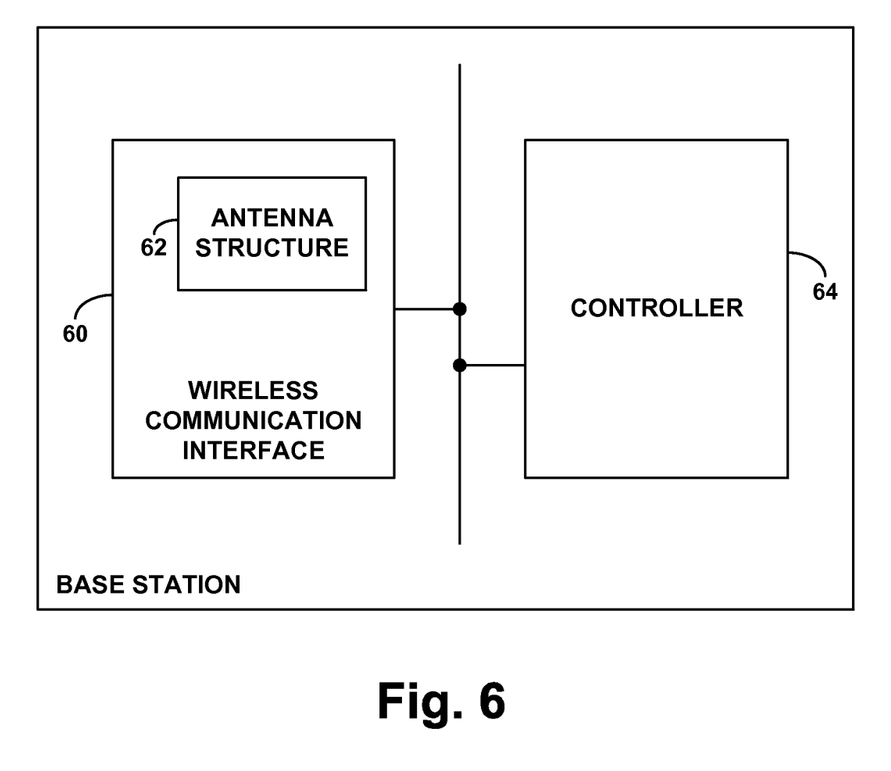
FIG. 6 is a block diagram depicting components of an example base station.

Finally, FIG. 6 is a simplified block diagram of base station, depicting some of the components that such a device or system could have to facilitate implementing methods such as those described above. As shown, the base station includes a wireless communication interface 60 including an antenna structure 62 and associated equipment to facilitate wireless transmitting and receiving communications. Further, the base station includes a controller 64 configured to control operation of the base station, by carrying out (e.g., causing the base station carry out) various operations such as those described above.

In practice, for instance, the controller may operate (a) to determine whether the energy level on the channel is a high level or rather a low level, (b) to detect a communication on the channel by detecting, as an indication of the communication, the high level of energy on the channel during a channel assessment period, (c) to determine a QoS class of the detected communication by detecting on the channel, in association with the detected communication, a sequence of energy levels each selected from the group consisting of the high level and the low level, the sequence being an indication of the QoS class, (d) to determine an occupancy time based at least in part on the determined QoS class of the detected communication, and (e) to cause the base station to occupy the channel for the determined occupancy time.

Like other components and features described above, the controller may take various forms. By way of example, the controller could include a processing unit (e.g., a one or more microprocessors) programmed with instructions executable to carry out the indicated operations. Further, the controller could be integrated with the wireless communication interface, such as being provided as a processor on a wireless communication interface chipset, or could be provided separately from the wireless communication interface but be in communication with the wireless communication interface and with other components of the base station. In addition, various features described above can be applied as well in the context of this base station.

Exemplary embodiments have been described above. Those skilled in the art will understand, however, that changes and modifications may be made to these embodiments without departing from the true scope and spirit of the invention.

We claim:

1. A method to control how long a device occupies a wireless channel, the method comprising:
   monitoring, by the device, energy level on the channel, to determine by the device whether the energy level on the channel is a high level or rather a low level, wherein the high level is defined as greater than or equal to a predefined energy level threshold, and wherein the low level is defined as less than the predefined energy level threshold;
   detecting by the device a communication on the channel by detecting, as an indication of the communication, the high level of energy on the channel during a channel assessment period;
   determining by the device a quality of service (QoS) class of the detected communication by detecting on the channel, in association with the detected communication, a sequence of energy levels each selected from the group consisting of the high level and the low level, the sequence being an indication of the QoS class;
   establishing by the device an occupancy time based at least in part on the determined QoS class of the detected communication; and
   occupying the wireless channel, by the device, for the determined occupancy time.

2. The method of claim 1, wherein detecting the sequence of energy levels in association with the detected communication comprises:
   detecting an end of the detected communication; and responsive to detecting the end of the detected communication, determining the sequence of energy levels that were on the channel just before the detected end of the communication.

3. The method of claim 2,
wherein detecting the end of the detected communication comprises detecting the low level of energy on the channel for the threshold duration following a last detected high level of energy on the channel.

4. The method of claim 1, wherein detecting the sequence of energy levels comprises comparing energy levels on the channel with one or more predefined sequences of energy levels, in search of a match.

5. The method of claim 1, wherein the QoS class is indicated by a combination of (i) the sequence of energy levels and (ii) each energy level of the sequence having a respective duration.

6. The method of claim 1, wherein the device operates with a first radio access technology, and wherein the detected communication is by another device operating with a second radio access technology different than the first radio access technology.

7. The method of claim 1, further comprising:
detecting by the device a plurality of communications on the channel, by detecting respectively as an indication of each communication the high level of energy on the channel during a respective channel assessment period; and
for each detected respective communication of the plurality, determining by the device a respective QoS class of the respective communication by detecting on the channel, in association with the respective communication, a respective sequence of energy levels each selected from the group consisting of the high level and the low level, the respective sequence being an indication of the respective QoS class of the respective communication,
wherein establishing by the device the occupancy time based at least in part on the determined respective QoS class of the detected communication comprises establishing by the device the occupancy time based at least in part on the determined respective QoS classes of the plurality of communications.

8. The method of claim 7, wherein establishing by the device the occupancy time based at least in part on the determined respective QoS classes of the plurality of communications comprises:
determining a cumulative QoS measure based on the determined respective QoS classes of the plurality of communications; and
establishing the occupancy time as a function of at least the determined cumulative QoS measure.

9. The method of claim 7, wherein the determined cumulative QoS measure is a first QoS measure, the method further comprising:
determining by the device a second QoS measure based on QoS classes of communications that the device engages in,
wherein establishing the occupancy time as a function of at least the determined cumulative QoS measure comprises establishing the occupancy time as a function of at least (i) the first QoS measure and (ii) the second QoS measure.

10. A method to control how long a base station occupies a wireless channel, wherein the base station is configured to serve user equipment devices on the wireless channel according to a first air interface protocol, and wherein the channel is also used for communication according to a second air interface protocol different than the first air interface protocol, the method comprising:
monitoring, by the base station, energy level on the channel, to determine by the base station whether the energy level on the channel is a high level or rather a low level, wherein the high level is defined as greater than or equal to a predefined energy level threshold, and wherein the low level is defined as less than the predefined energy level threshold;
determining by the base station a first representative quality of service (QoS) measure of a plurality of communications that occur on the channel and that are not served by the base station, by (i) detecting, as an indication respectively of each communication of the plurality, the high level of energy on the channel, (ii) determining a QoS class respectively of each detected communication by detecting on the channel, in association with the detected communication, a respective sequence of energy levels each selected from the group consisting of the high level and the low level, the sequence being an indication of the QoS class, and (iii) determining the first representative QoS measure based on the determined QoS classes of the plurality of detected communications;
determining by the base station a second representative QoS measure of communications that are served by the base station;
establishing by the base station an occupancy time as a function of at least the first and second representative QoS measures; and
occupying the wireless channel, by the base station, for the determined occupancy time.

11. The method of claim 10, wherein the first air interface protocol is a wireless wide area network (WWAN) protocol, and wherein the second air interface protocol is a wireless local area network (WLAN) protocol.

12. The method of claim 11, wherein the WWAN protocol is LTE, and wherein the WLAN protocol is WiFi.

13. The method of claim 10, wherein detecting the respective sequence of energy levels in association with the detected communication comprises:
detecting an end of the detected communication; and
responsive to detecting the end of the detected communication, determining the sequence of energy levels that were on the channel just before the detected end of the communication.

14. The method of claim 13,
wherein detecting the end of the detected communication comprises detecting the low level of energy on the channel for the threshold duration following a last detected high level of energy on the channel.

15. The method of claim 10, wherein detecting the respective sequence of energy levels comprises comparing energy levels on the channel with one or more predefined sequences of energy levels, in search of a match.

16. The method of claim 10, wherein the QoS class is indicated by a combination of (i) the sequence of energy levels and (ii) each energy level of the sequence having a respective duration.

17. The method of claim 10, wherein occupying the wireless channel comprises engaging in scheduled communication on the wireless channel.

18. A base station configured to control how long the base station occupies a wireless channel, wherein the base station is configured to serve user equipment devices on the wireless channel according to a first air interface protocol, and wherein the channel is also used for communication according to a second air interface protocol different than the first air interface protocol, the base station comprising:

an antenna structure configured to wirelessly transmit and receive communications;

a controller configured to control operation of the base station, wherein the controller is configured to carry out operations comprising:
- (a) determining whether the energy level on the channel is a high level or rather a low level, wherein the high level is defined as greater than or equal to a predefined energy level threshold, and wherein the low level is defined as less than the predefined energy level threshold,
- (b) detecting a communication on the channel by detecting, as an indication of the communication, the high level of energy on the channel during a channel assessment period,
- (c) determining a quality of service (QoS) class of the detected communication by detecting on the channel, in association with the detected communication, a sequence of energy levels each selected from the group consisting of the high level and the low level, the sequence being an indication of the QoS class,
- (d) determining an occupancy time based at least in part on the determined QoS class of the detected communication, and
- (e) causing the base station to occupy the channel for the determined occupancy time.

19. The base station of claim 18, wherein detecting the sequence of energy levels in association with the detected communication comprises:

detecting an end of the detected communication; and responsive to detecting the end of the detected communication, determining the sequence of energy levels that were on the channel just before the detected end of the communication.

20. The base station of claim 18, wherein the operations further comprise:

carrying out operations b and c for each of a plurality of communications on the channel, so as to determine QoS classes of the communications, wherein determining the occupancy time based at least in part on the determined QoS class of the detected communication comprises determining the occupancy time based at least in part on the QoS classes of the communications.

* * * * *